(12) United States Patent
Hein

(10) Patent No.: US 10,551,187 B2
(45) Date of Patent: Feb. 4, 2020

(54) METHOD AND DEVICE FOR DETERMINING THE LEADING EDGES OF TWO OVERLAPPING IMAGE CAPTURES OF A SURFACE

(71) Applicant: DEUTSCHES ZENTRUM FÜR LUFT-UND RAUMFAHRT E.V., Köln (DE)

(72) Inventor: Daniel Hein, Berlin (DE)

(73) Assignee: DEUTSCHES ZENTRUM FÜR LUFT-UND RAUMFAHRT E.V., Köln (DE)

( * ) Notice: Subject to any disclaimer, the term of this patent is extended or adjusted under 35 U.S.C. 154(b) by 0 days.

(21) Appl. No.: 16/469,097

(22) PCT Filed: Dec. 7, 2017

(86) PCT No.: PCT/EP2017/081913
§ 371 (c)(1),
(2) Date: Jun. 12, 2019

(87) PCT Pub. No.: WO2018/108711
PCT Pub. Date: Jun. 21, 2018

(65) Prior Publication Data
US 2019/0323838 A1 Oct. 24, 2019

(30) Foreign Application Priority Data
Dec. 13, 2016 (DE) .................. 10 2016 224 886

(51) Int. Cl.
*G06K 9/00* (2006.01)
*G01C 11/02* (2006.01)
(Continued)

(52) U.S. Cl.
CPC ............ *G01C 11/02* (2013.01); *B64C 39/024* (2013.01); *B64D 47/08* (2013.01); *G06T 7/13* (2017.01);
(Continued)

(58) Field of Classification Search
None
See application file for complete search history.

(56) References Cited

U.S. PATENT DOCUMENTS 5,604,534 A 2/1997 Hedges et al.
5,999,211 A 12/1999 Hedges et al.
(Continued)

FOREIGN PATENT DOCUMENTS

DE 69627487 T2 3/2004
DE 10228327 A1 9/2004
(Continued)

*Primary Examiner* — Hadi Akhavannik
(74) *Attorney, Agent, or Firm* — Bonini IP Law, LLC; Frank J. Bonini, Jr.

(57) ABSTRACT

The invention relates to a method and a device (1) for determining the leading edges (S1, S2) of two overlapping image captures of a surface (OF), comprising at least one camera (2) having a matrix-type sensor (6), having n lines (7), a position and location measuring system (3), an evaluation unit (4) and a storage means (5), wherein an elevation model (H) of the surface (OF) and a projection model (P) of the camera (2) are stored in the storage means (5), which the evaluation unit (4) can access, wherein the camera position (P1, P2) in the first and second image capture is determined by means of the position and location measuring system (3), wherein a horizontal mid-point (M) between the two camera positions (P1, P2) is determined and a projection of the midpoint (M) onto the surface (OF) is carried out, wherein a back projection onto the sensor (6) is carried out in the first and second camera position (P1, P2) by means of the projection model (P) for the point (MO) determined in the above-mentioned manner and a respective pixel is determined, wherein the respective line of the sensor (6) is determined, four solid angles (RW1-4) of the respective first and last pixel (Pix1-4) of the lines (7.Z1 M0, 7.Z2M0) are determined and their leading points (SP1-SP4) are determined with the elevation model (H), mid-points (M1, M2) are determined between the leading points and projected back into the sensors in the first and second position, associated lines are determined, wherein the smallest determined line (7.MIN1) is selected as the leading edge (S1) for the first camera position (P1) and the largest determined line (7.MAX2) is selected as the leading edge (S2) for the second camera position (P2).

5 Claims, 2 Drawing Sheets

Figure 1:
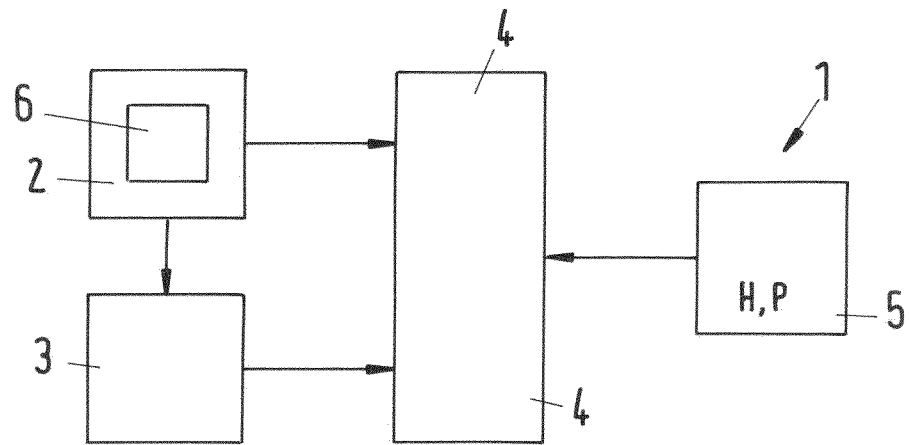

(51) Int. Cl.
*B64C 39/02* (2006.01)
*B64D 47/08* (2006.01)
*G06T 7/13* (2017.01)

(52) U.S. Cl.
CPC .. *B64C 2201/123* (2013.01); *B64C 2201/127* (2013.01); *G06T 2207/10032* (2013.01)

(56) References Cited

U.S. PATENT DOCUMENTS

| | | |
|---|---|---|
| 6,853,332 B1 | 2/2005 | Brookes |
| 10,273,000 B2 | 4/2019 | Wagner et al. |
| 2004/0218833 A1 | 11/2004 | Ejiri et al. |
| 2007/0046448 A1 | 3/2007 | Smitherman |
| 2009/0268027 A1* | 10/2009 | Yang ................. B60R 1/00 348/148 |
| 2010/0111364 A1* | 5/2010 | Iida ................ G06K 9/00214 382/103 |
| 2010/0246901 A1* | 9/2010 | Yang ................. B60R 1/00 382/107 |
| 2013/0076862 A1 | 3/2013 | Ohtomo et al. |
| 2015/0279042 A1* | 10/2015 | Michot ............... G06T 5/005 382/154 |
| 2016/0133019 A1 | 5/2016 | Wagner et al. |
| 2016/0335475 A1* | 11/2016 | Krenzer ............ G06K 9/00335 |

FOREIGN PATENT DOCUMENTS

| | | |
|---|---|---|
| EP | 0829168 A1 | 4/2003 |
| EP | 2 787 319 A1 | 10/2014 |

\* cited by examiner

METHOD AND DEVICE FOR DETERMINING THE LEADING EDGES OF TWO OVERLAPPING IMAGE CAPTURES OF A SURFACE

BACKGROUND OF THE INVENTION

1. Field of the Invention

The present invention relates to a method and a device for determining the leading edges of two overlapping image captures of a surface.

2. Brief Description of the Related Art

For various applications, in particular in the field of aerial remote sensing, real-time data transmissions of sensor data as well as visualization and/or evaluation of the transmitted data become increasingly important even during the scan flight.

During image capture today, sensors and cameras generate a high data stream, which is usually several orders of magnitude more extensive than the most recent transmission path and in particular can be transmitted from an airplane to a ground station over greater distances. For real-time transmission of such sensor data, data reduction is therefore usually necessary at the transmitting end. At the same time, the sensor data captured in a scan flight often has a high degree of overlap with respect to surface segments captured per aerial image, also referred to as footprints, as a function of the flight altitude, air speed, aperture angle and the trip frequency of the sensors. By ascertaining suitable leading edges of the image captures, it is possible to discard some image data as redundant data that need not be transmitted.

In doing so, however, a few problems arise under practical conditions. Thus the aforementioned parameters are not constant, as a result of which the overlap is not constant. This problem is intensified when the orientation of the camera, i.e., its position in space changes between image captures.

The problem of optimum leading edges occurs not only in real-time operation but in general when aerial image captures are to be assembled quickly with an overlap to form an overall image, a so-called aerial image mosaic.

A method for capturing aerial images with an unmanned and controllable aircraft with camera is known from EP 2 787 319 A1 in which a camera position and an orientation of an optical camera axis are determined continuously during aircraft movement. For each aerial image of the series of aerial images, the capturing of the respective aerial image is triggered during flight with the aircraft through a respective image-triggering region, the position of the respective image-triggering region being determined at least by a respective trigger position on a flight plan that is associated with the respective image-triggering region and as a function of the orientation of the optical camera axis during flight through the respective image-triggering region so as to satisfy a defined maximum angular deviation relative to a predetermined spatial orientation for the camera axis.

SUMMARY OF THE INVENTION

The present invention is based on the technical problem of making available a method for determining leading edges of two overlapping image captures of a surface so as to ensure the greatest possible data reduction without any loss of information (i.e., without any gaps) in the aerial image mosaic) as well as creating a suitable device for accomplishing this goal.

The solution to the technical problem is obtained by a method having the features of claim 1 as well as a device having the features of claim 5. Additional advantageous embodiments of the invention are derived from the dependent claims.

The method for determining the leading edges of two overlapping image captures of a surface captured by means of one or more cameras using matrix-type sensors is carried out by means of an altitude model of the surface, the projection models of all cameras involved in the image captures as well as a position and location measuring system. The altitude model describes for each coordinate both the altitude and the point of intersection with the altitude model for any ray in space as a point in space. The projection model of a camera can describe the solid angle (forward projection) for each pixel of an image capture recorded with this camera as well as describing the respective pixel on sensor service for any world point in space (back projection). The projection model is defined here with the help of the internal camera parameters, such that the respective instantaneous external orientation (i.e., the position and location at the time of capture) of the camera also enters into the model. These six degrees of freedom (three translational degrees of freedom and three rotational degrees of freedom) are supplied by the position and location measuring system. Various embodiments of such a position and location measuring system are known.

In a first step, the position data of the camera for the first image capture is ascertained, and the position data of the camera for the second image camera is ascertained. Without restrictions, these may involve one and the same camera being moved between captures, but they may also be captures from two different cameras. In doing so, a defined point is preferably selected with respect to the camera(s), whose coordinates in space are determined at the time of the capture. For example, this may be the position of the focal point of the camera at the time of the capture. In addition, the midpoint in space between the two items of position data is ascertained, and a perpendicular projection of this midpoint onto the surface is carried out, taking into account the altitude model. A point on the surface is ascertained in this way. By means of the projection model, the respective associated pixel for this point is determined first in the sensor plane of the camera in the first camera position and again in the sensor plane of the camera in the second camera position. It should be pointed out here that if the two image captures are recorded by different cameras, the respective camera-specific projection model must be used. As the next step, the respective line of the sensor in which the pixel is located is ascertained. It is assumed here that the Z1M0-th line has the pixel in the first camera position, and the Z2M0-th line has the pixel in the second camera position. In addition, it should be assumed that the lines are arranged across the direction of flight. If there were no relative rotation, i.e., if there were only a translational change, in the location between the two camera positions, and if the surface in the overlapping area were flat, then this would already be the result, i.e., the data from the first line to the (Z1M0−1)-th line (the first Z1M0−1 lines in the upper area of the image) from the first camera position and the data from the (Z2M0+1)-th line to the $n^{th}$ line (the last n−(Z2M0+1) lines in the image area) from the second camera position can be discarded.

However, due to rotations (for example, if the airplane is flying a curve), or due to the structure of the terrain captured (i.e., the structure of the elevation model), for example, it may happen that gaps then appear between the two resulting footprints. This is compensated by the subsequent method steps. To this end, four solid angles are determined for the first and last pixels of the respective lines (Z1M0 for the first camera position and Z2M0 for the second camera position) of the sensor determined with the help of the projection model, and the four points of intersection of these four solid angles with the altitude model are ascertained—these four points on the elevation model correspond to the exterior surface points detected by the two sensor lines Z1M0 and Z2M0. Next, horizontal midpoints are ascertained for the first pixels of the lines and the last pixels of the lines, taking into account the altitude model between the two points of intersection, i.e., in graphical terms, the midpoints on the elevation model between the two outer left surface points detected and the two outer right surface points detected. Next, these two midpoints determined in this way are projected back into the two sensor planes (i.e., the sensor for the first camera position and the sensor for the second camera position), taking into account the projection models—thus yielding the two pixels corresponding to the two midpoints on the surface per sensor. The line numbers for these pixels are taken into account. In the general case, the pixels in the two sensor planes are not located in the same line, so the line numbers are different. Next, the smallest line determined is selected as the (new) leading edge for the first camera position, and the largest line determined is selected as the (new) leading edge for the second camera position. The result then yields two footprints without a gap as far as the edges, with the number of redundant data being minimized.

The two image captures are preferably recorded by one camera with a time lag.

In another embodiment, the leading edges are ascertained on-board a carrier system for the camera, for example, an airplane, wherein the data of the image captures thereby reduced is further transmitted in real time to a central station (for example, a ground station). Then additional data compression methods may be used for the data transfer.

BRIEF DESCRIPTION OF THE DRAWING FIGURES

Figure 2:
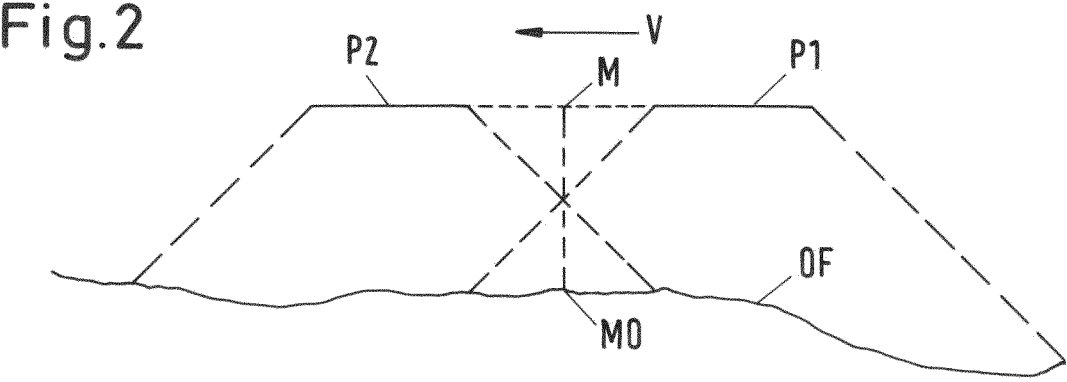
Figure 3:
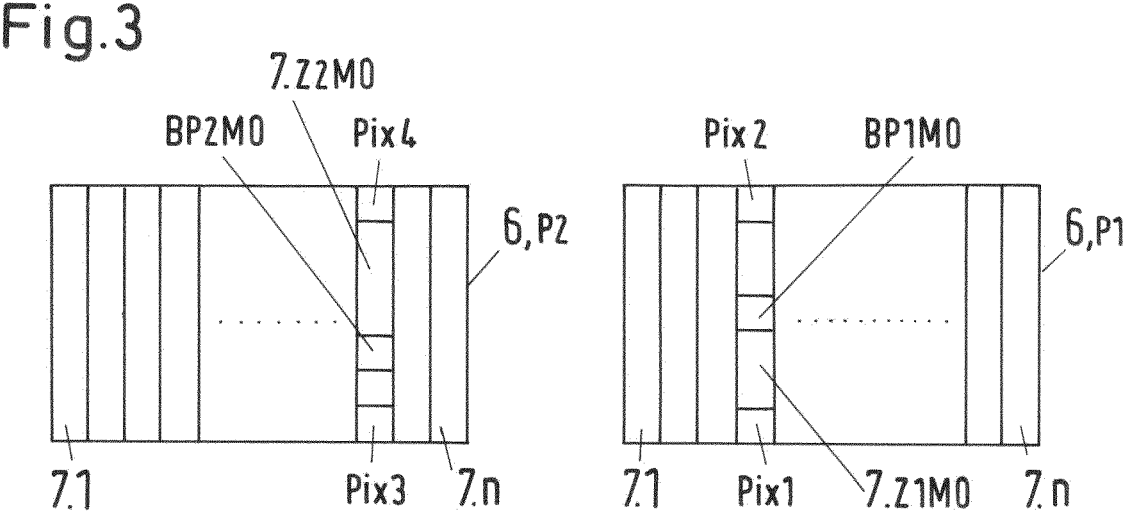
Figure 4:
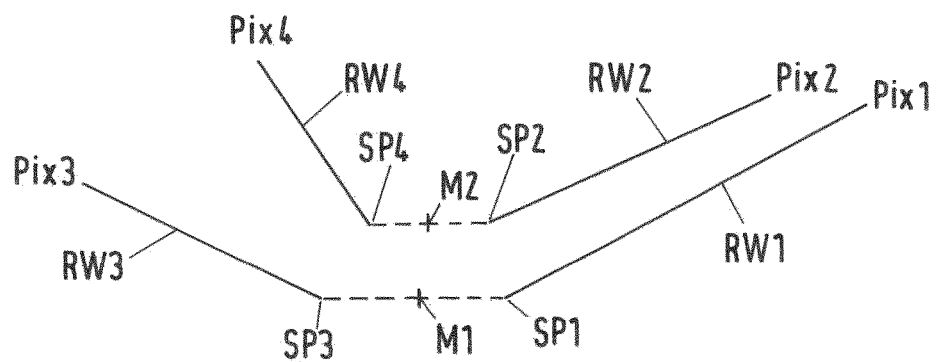
Figure 5:
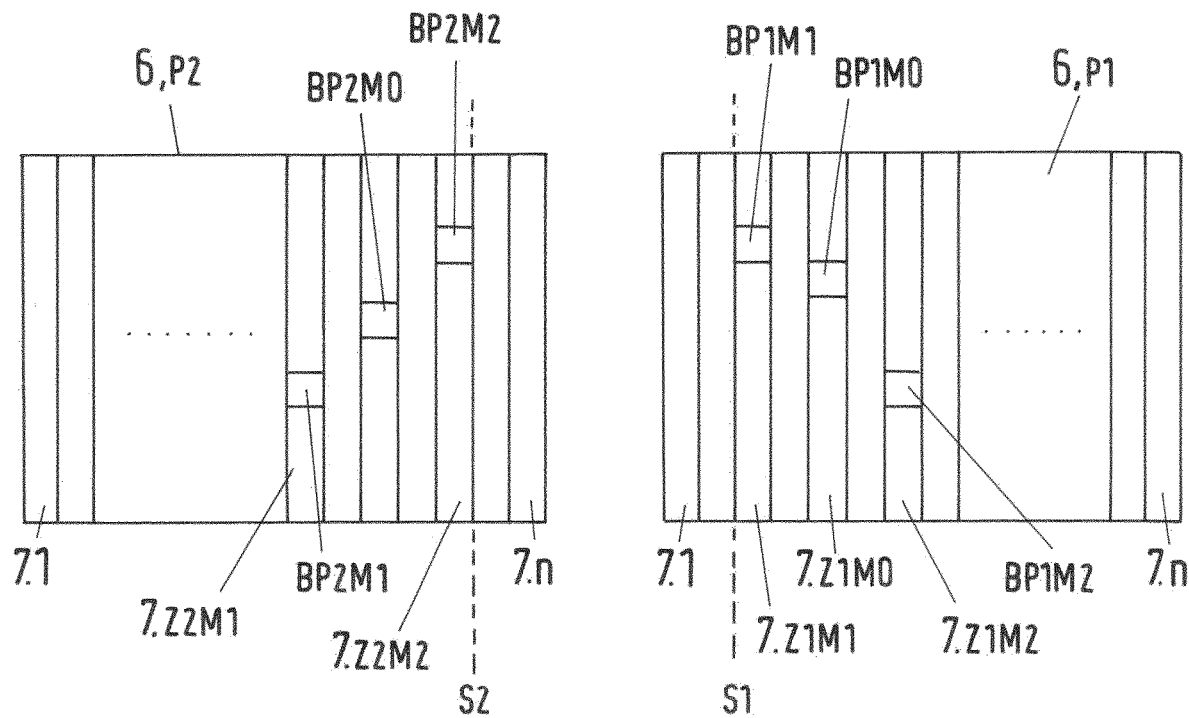

The present invention will now be explained in greater detail on the basis of a preferred embodiment. In the drawings:

FIG. 1 shows a schematic block diagram of a device for determining the leading edges of two overlapping image captures of a surface, FIG. 2 shows a schematic diagram of the image capture position, FIG. 3 shows a schematic top view of a sensor in first and second camera positions, FIG. 4 shows a schematic diagram of four solid angles, and FIG. 5 shows another schematic top view of the sensor in the first and second camera positions.

DETAILED DESCRIPTION OF THE INVENTION

FIG. 1 shows a schematic block diagram of a device 1 for determining the leading edges of two overlapping image captures of a surface, wherein the device has a camera 2, a position and location measuring system 3, an evaluation unit 4 and a memory 5. The camera 2 has a matrix-type sensor 6. The position and location measuring system 3 is synchronized with the camera 2, so that the current position and location data can be determined for each image capture. The memory contains an altitude model H of the surface and a projection model P of the camera.

The operation of the device 1 will now be explained on the basis of the following figures. FIG. 2 illustrates schematically a situation in which the camera 2 makes a first image capture of the surface OF at a first point in time t1 in a first camera position P1 (x1, y1, z1, $\alpha$1, $\beta$1, $\gamma$1). The camera 2 and/or the device 1 is/are mounted on an airplane, for example, and moves at the speed V. At a second point in time t2, the camera 2 is in a second camera position P2 (x2, y2, z2, $\alpha$2, $\beta$2, $\gamma$2) and makes a second image capture. The "fields of view" of the camera 2 are shown with dashed lines here, where it can be seen that the two image captures overlap. The evaluation unit 4 then determines a horizontal midpoint M between the first camera position P1 and the second camera position P2, and then this midpoint M is projected perpendicularly onto the altitude model H of the surface OF. As a result, this yields a point M0 on the elevation model. For this point M0, the respective pixel BP1M0 on the sensor 6 is then determined in the first camera position P1, and the pixel BP2M0 on the sensor 6 is determined in the second camera position P2 (see also FIG. 3). It is assumed here that the sensor 6 has n lines 7, such that the first line 7.1 is the farthest toward the front in the direction of flight, and the last line 7.n is the farthest toward the rear. It is assumed here that the pixel BP1M0 is in the Z1M0–1-th line 7.Z1M0 and that the pixel BP2M0 is in the Z2M0-th line 7.Z2M0. For a planar surface and without any relative rotations between camera positions P1 and P2 (i.e., $\alpha$1=$\alpha$2, $\beta$1=$\beta$2, $\gamma$1=$\gamma$2), these would be the leading edges, i.e., the data of the 7.1-th to 7.Z1M0–1-th lines in the first camera position, and the data of the 7.Z2M0+1 to 7.n-th line in camera position P2 would be discarded, i.e., cut out.

In the general case, i.e., when the surface in the overlap area is not planar and/or there is additionally a relative rotation between P1 and P2 (i.e., $\alpha$1≠$\alpha$2 or $\beta$1≠$\beta$2 or $\gamma$1≠$\gamma$2), gaps may occur between the two footprints determined in the previous step. To close these gaps, the four solid angles RW1-RW4 of the first pixel Pix1 and the last pixel Pix2 of the Z1M0-th line and the first pixel Pix3 and the last pixel Pix4 of the Z2M0-th line are determined by means of the projection model P, and the four points of intersection SP1-4 with the surface OF are determined, taking into account the altitude model H. For the distance between the points of intersection SP1 and SP3 as well as SP2 and SP4, the horizontal midpoints M1, M2 on the elevation model H are each determined (see FIG. 4). For the two midpoints M1, M2 thus determined, the respective pixels BP1M1 and BP1M2 on the sensor 6 in the first camera position P1 and the pixels BP2M1 and BP2M2 on the sensor 6 in the second camera position P2 can again be ascertained by means of the projection model P.

Now there are three pixels for each camera position, namely pixels BP1M0, BP1M1, BP1M2 for the camera position P1, and the pixels BP2M0, BP2M1, BP2M2 for camera position 2. The respective line numbers Z1M0, Z1M1, Z1M2 and Z2M0, Z2M1, Z2M2 for these pixels will be considered below. The line 7.MIN1 with the smallest line number MIN1=minimum of the line numbers (Z1M0, Z1M1, Z1M2) is now selected for the leading edge for the first camera position P1. Accordingly, the line 7.MAX2 with the largest line number MAX2=maximum of the line numbers (Z2M0, Z2M1, Z2M2) is selected for the second camera position P2. This shift in the leading edges S1, S2 toward the "front" (in the direction of flight) for the first camera position and to the "rear" for the second camera position P2 ensures that the two footprints thereby obtained will be adjacent to one another without a gap, so that the data volume is minimized.

This method selects, for each detected surface point of the overflown area, the aerial image and the image region that has detected this surface point with the lowest inclination. In this way, the best overview of the territory covered by the flight is ensured, on the one hand, while, on the other hand, minimizing possible objections due to inaccuracies in the real-time projection (due to inaccuracies in the altitude model used, measurement errors in the position and location measuring system as well as errors in the projection model).

This method is suitable for all cameras using matrix-type sensors, i.e., matrix cameras are also imaging spectrometers.

The invention claimed is:

1. A method for determining the leading edges (S1, S2) of two overlapping image captures of a surface (OF), wherein the image captures are captured by at least one camera (2), wherein the at least one camera (2) has a matrix-type sensor (6) having n lines (7), wherein a leading edge being a line of the matrix-type sensor, wherein data of lines above or below the loading edge will ignored as redundant, comprising the following method steps:

the camera positions (P1, P2) of the at least one camera (2) are determined by means of a position and location measuring system (3) in the first image capture and in the second image capture, a horizontal midpoint (M) between the two camera positions (P1, P2) is determined and a vertical projection of this midpoint (M) onto the surface (OF) is carried out taking into account a filed in advanced altitude model (H) of the surface (OF) so that a point (M0) is determined, wherein the altitude model (H) describes to each coordinate a height, so that for each coordinate the height as well as a point of intersection with the altitude model for any ray in space as a point in space can be determined, the pixels (BP1M0, BP2M0) of the point (M0) in the sensor (6) are determined for the first camera position (P1) and the second camera position (P2) by means of a projection model (P) of the at least one camera (2), taking into account the data of the position and location measuring system (3), wherein the projection model (P) of a camera (2) can describe the solid angle of each pixel of an image capture as well as to each point in space the corresponding pixel of an image capture on the surface of the sensor, determining the respective line (7.Z1M0, 7.Z2M0) of the sensor (6) in which the respective pixel (BP1M0, BP2M0) is, determining the four solid angles (RW1-RW4) of the first and the last pixels (Pix1, Pix2, Pix3, Pix4) of the respective line determined (7.Z1M0, 7.Z2M0) of the sensor (6) with the help of the projection model (P) and determining the four points of intersection (SP1-SP4) of the four solid angles (RW1-RW4) with the altitude model (H), determining the horizontal midpoints (M1) taking into account the altitude model (H) between the two points of intersection (SP1, SP3) for the first pixels (Pix1, Pix3) of the lines (7.Z1M0, 7.Z2M0) and determining the horizontal midpoint (M2) taking into account the altitude model (H) between the two points of intersection (SP2, SP4) for the last pixels (Pix2, Pix4) of the lines (7.Z1M0, 7.Z2M0), ascertaining the two pixels (BP1M1, BP1M2) of the two midpoints (M1, M2) in the sensor (6) for the first camera position (P1) and the two pixels (BP2M1, BP2M2) in the sensor (6) for the second camera position (P2) by means of the projection model (P), determining the respective lines (7.Z1M1, 7.Z1M2) and (7.Z2M1, 7.Z2M2) of the pixels (BP1M1, BP1M2) and (BP2M1, BP2M2) of the two midpoints (M1, M2), wherein the smallest line with reference to the line number ascertained (7.MIN1) for the first camera position (P1), wherein MIN1 is the minimum of (Z1M0, Z1M1, Z1M2), and the largest line with reference to the line number ascertained (7.MAX2) for the second camera position (P2), wherein MAX2 is the maximum of (Z2M0, Z2M1, Z2M2), both form the leading edges (S1, S2).

2. The method according to claim 1, wherein the two image captures are recorded by a camera (2) with a time lag.

3. The method according to claim 2, wherein the leading edges (S1, S2) are ascertained on-board a carrier system for the camera (2).

4. The method according to claim 3, wherein the data of the image captures reduced by means of the leading edges (S1, S2) is transmitted in real time to a central station.

5. A device (1) for ascertaining the leading edges (S1, S2) of two overlapping image captures of a surface (OF), comprising at least one camera (2) having a matrix-type sensor (6), which has n lines (7), a position and location measuring system (3), an evaluation unit (4) and a memory (5), wherein an altitude model (H) of the surface (OF) and a projection model (P) of the camera (2) are stored in the memory (5) such that the evaluation unit (4) can have access to said models, wherein the projection model (P) of a camera can describe the solid angle of each pixel of an image capture as well as to each point in space the corresponding pixel of an image capture on the surface of the sensor, wherein the altitude model (H) describes to each coordinate a height, so that for each coordinate the height as well as a point of intersection with the altitude model for any ray in space as a point in space can be determined, wherein the device (1) is designed so that the camera position (P1, P2) of the at least one camera (2) is ascertained by means of the position and location measuring system (3) in the first and second image captures, wherein a horizontal midpoint (M) between the two camera positions (P1, P2) is ascertained, and a vertical projection of this midpoint (M) onto the surface (OF) is carried out, taking into account the altitude model (H), wherein a back projection onto the sensor (6) is carried out by means of the projection model (P) in the first and second camera positions (P1, P2) for the point (M0) thereby ascertained, and a pixel (BP1M0, BP2M0), is ascertained for each, wherein the respective line (7.Z1M0, 7.Z2M0) of the sensor (6) is ascertained, in which the respective pixel (BP1M0, BP2M0) is, wherein four solid angles (RW1-RW4) of the respective first and second pixels (Pix1-Pix4) of the respective lines (7.Z1M0, 7.Z2M0) of the sensor (6) are determined with the help of the projection model (P), and their points of intersection (SP1-SP4) with the altitude model (H) between the two points of intersection (SP1, SP3; SP2, SP4) are determined for the first pixels (Pix1, Pix3) of the lines (7.Z1M0, 7.Z2M0), and the last pixels (Pix 2, Pix4) of the lines (7.Z1M0, 7.Z2M0) are determined, such that two pixels (BP1M1, BP1M2) of the two midpoints (M1, M2) are ascertained for the first camera position (P1), and two pixels (BP2M1, BP2M2) of the two midpoints (M1, M2) in the sensor (6) are determined by means of the projection model (P) for the second camera position (P2), and the respective lines (7.Z1M1, 7.Z1M2) of the pixels (BP2M1, BP2M2) of the two midpoints (M1, M2) are determined for the camera position (P2), wherein for the first camera position (P1) the smallest line with reference of the line number MIN1 is ascertained, wherein MIN1 is the minimum of (Z1M0, Z1M1, Z1M2), and for the second camera position (P2) the largest line with reference of the line number MAX2 is ascertained, wherein MAX2 is the maximum of (Z2M0, Z2M1, Z2M2), both form the leading edges (S1, S2).

* * * * *